US006997432B2

(12) United States Patent
Rapp

(10) Patent No.: US 6,997,432 B2
(45) Date of Patent: Feb. 14, 2006

(54) ELECTROMAGNETIC VALVE FOR CONTROLLING AN INJECTION VALVE OF AN INTERNAL COMBUSTION ENGINE

(75) Inventor: Holger Rapp, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 77 days.

(21) Appl. No.: 10/332,729

(22) PCT Filed: Apr. 17, 2002

(86) PCT No.: PCT/DE02/01418

§ 371 (c)(1),
(2), (4) Date: Aug. 19, 2003

(87) PCT Pub. No.: WO02/092991

PCT Pub. Date: Nov. 21, 2002

(65) Prior Publication Data

US 2004/0026644 A1 Feb. 12, 2004

(30) Foreign Application Priority Data

May 12, 2001 (DE) ........................................ 101 23 171

(51) Int. Cl.
*F16K 31/02* (2006.01)

(52) U.S. Cl. ............................ 251/129.16; 251/129.19; 239/585.3

(58) Field of Classification Search ............ 251/129.16, 251/129.19; 239/585.3, 585.1
See application file for complete search history.

(56) References Cited

U.S. PATENT DOCUMENTS 5,560,549 A * 10/1996 Ricco et al. ............. 239/585.1
6,062,531 A * 5/2000 Rapp et al. ............ 251/129.19
6,068,010 A * 5/2000 Reinicke ................ 251/129.16
6,161,813 A * 12/2000 Baumgartner et al. . 251/129.16
6,199,774 B1 * 3/2001 Ricco .................... 251/129.16
6,496,092 B1 * 12/2002 Schnatterer et al. ... 251/129.16
6,517,045 B1 * 2/2003 Northedge ............. 251/129.16
6,764,061 B1 * 7/2004 Haeberer et al. ...... 251/129.19

FOREIGN PATENT DOCUMENTS

| | | |
|---|---|---|
| DE | 196 50 865 | 6/1998 |
| DE | 197 08 104 | 9/1998 |
| DE | 198 32 826 | 6/2000 |
| WO | WO 99 57429 | 11/1999 |

* cited by examiner

*Primary Examiner*—John Bastianelli
(74) *Attorney, Agent, or Firm*—Kenyon & Kenyon

(57) ABSTRACT

The present invention is directed to a solenoid valve for controlling a fuel injector in an internal combustion engine, having an electromagnet, an armature having an armature pin which is movably supported with respect to the electromagnet, and an armature plate supported on the armature pin in a manner allowing sliding movement, and a control-valve member moved together with the armature and cooperating with a valve seat to open and close a fuel discharge passage, the armature plate, in response to the control-valve member striking the valve seat during the closing of the solenoid valve, being able to be moved, under the influence of its own inert mass, along the armature pin along an overtravel distance, from a stop secured to the armature pin up to a stationary overtravel stop. To avoid post-oscillations of the armature plate on the armature pin when closing the solenoid valve, the armature plate is supported on the armature pin between the overtravel stop and the stop secured to the armature pin, in a manner that is free of returning elastic spring forces and allows sliding movement.

3 Claims, 2 Drawing Sheets

ELECTROMAGNETIC VALVE FOR CONTROLLING AN INJECTION VALVE OF AN INTERNAL COMBUSTION ENGINE

BACKGROUND INFORMATION

A solenoid valve, which is known, for example, from German Patent Application No. DE 196 50 865, is used for controlling the fuel pressure in the control pressure chamber of a fuel injector, for example, of an injector of a common-rail injection system. In such injection valves, the fuel pressure in the control pressure chamber controls the movement of a valve plunger with which an injection orifice of the injection valve is opened or closed. The known solenoid valve features an electromagnet located in a housing part, a movable armature and a control-valve member which is moved together with the armature and acted upon in the closing direction by a closing spring. The control-valve member cooperates with a valve seat of the solenoid valve, thereby controlling the fuel discharge from the control pressure chamber.

A known disadvantage of the solenoid valves consists in the so-called armature bounce. When the magnet is deenergized, the closing spring of the solenoid valve accelerates the armature and, with it, the control-valve member toward the valve seat in order to close a fuel discharge passage from the control pressure chamber. The impact of the control valve member on the valve seat causes disadvantageous oscillations and/or bouncing of the control-valve member at the valve seat, which has a detrimental effect on the control of the injection process. For this reason, the solenoid valve known from German Patent Application No. DE 196 50 865 has an armature that is designed in two parts and includes an armature pin and an armature plate slidably supported on the armature pin, so that, when the valve control member strikes the valve seat, the armature plate continues its movement against the elastic force of a return spring. Subsequently, the return spring returns the armature plate to its defined original position at a stop secured to the armature pin. In this way, the armature plate is pulled up at an always identical, predefined distance when the electromagnet is reenergized.

While the effectively decelerated mass and, thus, the kinetic energy of the armature striking the valve seat, which causes the bouncing, are indeed reduced by the two-piece design of the armature with the restoring spring, the armature plate, upon which the spring force of the restoring spring acts, may oscillate on the armature pin in a disadvantageous manner once the solenoid valve is closed. During the post-oscillation process, the armature plate may strike the stop secured to the armature pin, thereby briefly opening the solenoid valve. This brief opening does not cause a significant pressure drop in the control-pressure chamber of the fuel injector and, thus, an unintended injection. However, the activation of the electromagnet for the next injection may not be initiated during this brief phase since this would affect the fuel quantity injected into the combustion chamber of the internal combustion chamber in an undefined manner, and cause serious deviations in the injection quantity. Therefore, a defined injection quantity will only be achieved again in a reliable manner once the armature plate has stopped oscillating. Restricting the duration of the post-oscillation process is of great importance, especially for representing short time intervals between, for instance, a pre-injection and a main-injection. For this reason, known solenoid valves use a fixed overtravel stop which restricts the maximum overtravel distance by which the armature plate may move on the armature pin subsequent to the control-valve member striking the valve seat. However, while this measure may reduce the post-oscillations of the armature plate, it cannot stop them.

SUMMARY OF THE INVENTION

It has been discovered that, if the return spring is entirely omitted, it is possible not only to avoid disadvantageous post-oscillations of the armature plate in a solenoid valve having a two-part armature, but to implement a defined injection in a new activation of the electromagnet at the same time as well. Contrary to a long-held misconception, the restoring spring is not absolutely necessary to ensure a defined new injection. Since the overtravel stop makes it possible to limit to a small amount the distance by which the armature plate may move on the armature pin once the control-valve member strikes the valve seat, a defined new injection may be achieved even in the absence of a restoring spring. While it is true that the armature plate is not returned to the stop secured to the armature pin when the restoring spring is omitted, the armature plate is attracted so quickly, however, once the electromagnet is energized that it reaches the stop at the armature pin with practically no noticeable time delay. The armature plate and the armature pin with the control-valve member, thereupon, are accelerated toward the electromagnet, and the solenoid valve is opened. In this manner, the undesired opening of the solenoid valve, due to the post-oscillations of the armature plate, is prevented in an advantageous manner, so that the solenoid valve is able to be reactivated at any time once the armature plate has reached its overtravel stop.

DETAILED DESCRIPTION

Figure 1:
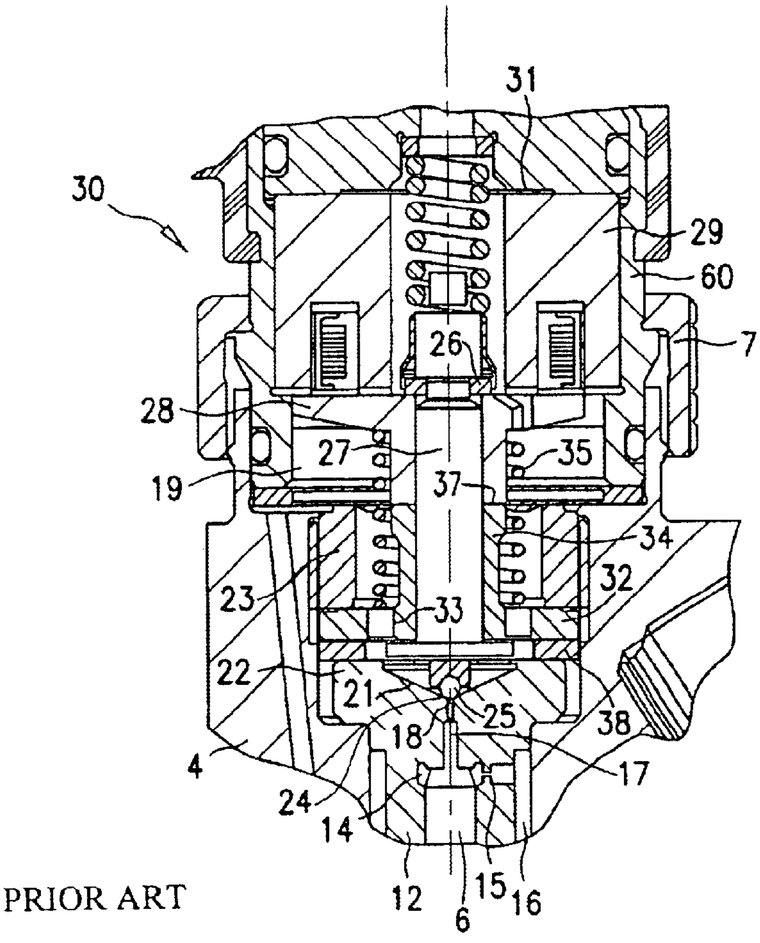
PRIOR ART Fig. 1
FIG. 1 shows a section of the upper part of a fuel injector having a solenoid valve as known from the related art.

FIG. 1 shows the upper part of a fuel injector known from the related art, which is intended to be used in a fuel injection system, particularly in a common rail system for diesel fuel equipped with a fuel high-pressure reservoir that is continually supplied with high-pressure fuel by a high-pressure fuel booster pump. The known fuel injector includes a valve housing 4 having a longitudinal bore, in which a valve plunger 6 is positioned, whose one end (not shown in Figure) acts upon a valve needle positioned in a nozzle body. The valve needle is disposed in a pressure chamber, which is supplied with fuel under high pressure via a pressure bore. During an opening stroke of valve plunger 6, the valve needle is lifted up, against the closing force of a spring, by the high fuel pressure in the pressure chamber, which continuously acts on a pressure shoulder (an exposed annular area) of the valve needle. Via an injection orifice, which is then connected to the pressure chamber, the fuel is injected into the combustion chamber of the internal combustion engine. By lowering valve plunger 6, the valve needle is pressed into the valve seat of the fuel injector in the closing direction, completing the injection process. Valve plunger 6, by its end facing away from the valve needle, is guided in a cylindrical bore, which has been introduced in a valve piece 12 set into valve housing 4. In the cylindrical bore, the end face of valve plunger 6 encloses a control-pressure chamber 14, which is connected to a fuel high-pressure connection (not shown) via a supply channel.

The inlet passage is essentially designed in three parts. A bore, whose inner walls form a supply throttle 15 along part of their length, extends radially through the wall of valve piece 12 and is constantly connected to an annular space 16 that surrounds valve piece 12 on its outer circumference, which annular space, in turn, is in constant connection to the fuel high-pressure connection. Via inlet throttle 15, control pressure chamber 14 is subjected to the high fuel pressure present in the high-pressure fuel accumulator. Coaxially to valve plunger 6, a bore branches off from control pressure chamber 14, the bore running in valve piece 12 and forming a fuel discharge passage 17 which is provided with a discharge throttle 18 and empties into a relief chamber 19 which is connected to a low-pressure fuel connection 1 (not shown in FIG. 1) which, in turn, is connected to the fuel return of fuel injector 1. The outlet of fuel discharge passage 17 from valve piece 12 occurs in the region of a conically countersunk piece 21 of the external end face of valve piece 12. Valve piece 12, together with an adjustment disk 38 and flange 32 of a sliding block 34, is fixedly braced in valve housing 4 via a screw member 23.

A valve seat 24, with which a control-valve member 25 of a solenoid valve 30 controlling the fuel injector cooperates, is formed in conical part 21. Control-valve member 25 is coupled to a two-part armature in the form of an armature pin 27 and an armature plate 28, the armature cooperating with an electromagnet 29 of the solenoid valve 30. Solenoid valve 30 also includes a housing part 60 accommodating electromagnet 29, which is firmly connected to valve housing 4 via connecting means 7 which may be screwed together. In the known solenoid valve, armature plate 28 rests on armature pin 27, in such a manner that it is dynamically movable against the prestressing force of a return spring 35 under the action of its inertial mass and, in the resting state, is pressed via this return spring against a stop 26, which is secured to the armature pin and designed as a crescent disk slipped over the armature pin. By its other end, return spring 35 is supported at flange 32 of sliding block 34, which guides armature pin 27 in a feed-through opening. Armature pin 27 and, with it, armature plate 28 and control valve member 25 which is coupled to armature pin 27, are permanently acted upon in the closing direction by a closing spring 31 which is immovably supported relative to the housing, so that control valve member 25 normally rests against valve seat 24 in the closed position. When the electromagnet is energized, armature plate 28, and with it armature pin 27, is attracted by the electromagnet and, in the process, discharge passage 17 is opened toward relief chamber 19. Armature pin 27, at the end facing away from electromagnet 29, has an annular shoulder 33, which strikes sliding block 34 when the electromagnet is energized and, in this manner, limits the opening lift of control-valve member 25. Adjustment disk 38 may be used to adjust the opening lift.

The opening and closing of the fuel injector are controlled by solenoid valve 30 as described below. As explained previously, armature pin 27 is constantly acted upon in the closing direction by closing spring 31, so that control-valve member 25 lies against valve seat 24 in the closing position when the electromagnet is not activated, and control pressure chamber 14 is closed towards pressure relief side 19. As a result, the high pressure present in the fuel high-pressure reservoir very rapidly builds up there as well, via the supply channel. The pressure in control pressure chamber 14 generates a closing force on valve plunger 6, and thus on the valve needle connected with it, which is greater than the forces acting on the other side in the opening direction as a result of the high pressure present. When control pressure chamber 14 is opened toward relief side 19 by the opening of the solenoid valve, the pressure in the small volume of control pressure chamber 14 is reduced very quickly, since the control pressure chamber is decoupled from the high pressure side via inlet throttle 15. As a consequence, the force of the high fuel pressure present at the valve needle, which acts on the valve needle in the opening direction, predominates, so that the valve needle is moved upward and, in the process, the at least one injection orifice is opened for injection. However, when solenoid valve 30 closes fuel discharge passage 17, the pressure in control pressure chamber 14 is able to be built up again by the subsequent flow of fuel via supply channel 15, so that the original closing force is present, closing the valve needle of the fuel injector.

When the solenoid valve is closed, closing spring 31 rapidly presses armature pin 27 with control-valve member 25 against valve seat 24. A disadvantageous bounce or post-oscillating of the control-valve member is the result of the elastic deformation of the valve seat caused by the impact of the armature pin on the valve seat, which acts as an energy store. Part of the energy, in turn, is transmitted to control-valve member 25, which then bounces off from valve seat 24 together with the armature pin. The known solenoid valve shown in FIG. 1, therefore, uses a two-part armature with an armature plate 28 that is decoupled from armature pin 27. In this manner, the overall mass striking valve seat 24 may be reduced, but armature plate 28 may have disadvantageous post-oscillations. For this reason, the known solenoid valve is provided with an overtravel stop 37, which is formed by an end piece facing the armature plate of a section of sliding member 34 designed as a guide sleeve. Overtravel stop 37 limits the maximal overtravel distance by which armature plate 28 may move along armature pin 27 from stop 26, secured to armature pin 27, after control-valve member 25 has struck valve seat 24. Overtravel stop 37 reduces the post-oscillations of armature plate 28, and armature plate 28 returns more quickly to its original position at stop 26 in the form of a crescent disk.

Figure 2:
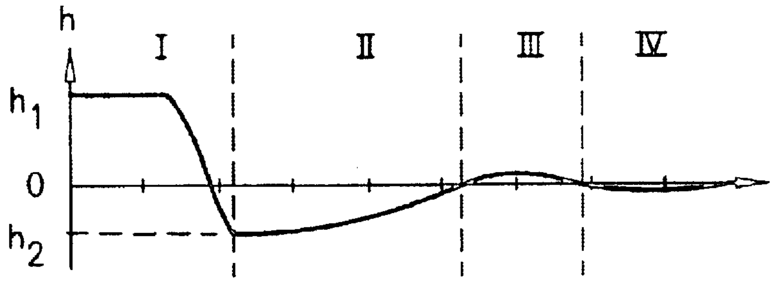
PRIOR ART Fig. 2
FIG. 2 shows the valve travel of the armature plate for the known solenoid valve as a function of time.

In FIG. 2, the lift curve of the armature plate is shown as a function of time during the opening of the solenoid valve. When the solenoid valve is closed, armature plate 28, in a first time interval I, initially moves with armature pin 27 by distance h1 of, for instance, 38 micrometer, until the control-valve member strikes the valve seat at h=0. Subsequently, armature plate 28, in time interval I, moves further by the overtravel distance until striking overtravel stop 37, traveling a maximum overtravel distance h2 of, for instance, approximately 20 micrometer, and is stopped there. In the then following time interval II, return spring 35 moves the armature plate back, up to crescent disk 26. In time interval III, the armature plate lifts off the armature pin and the control-valve member from the valve seat, thereby causing solenoid valve to open briefly. When the armature plate swings back, the control-valve member again strikes the valve seat at the beginning of time interval IV. Due to the oscillations of the armature plate, no renewed activation of the solenoid valve is able to be initiated in time interval III, since the solenoid valve briefly opens in this time interval. Therefore, the activation of the solenoid by applying voltage to the electromagnet must only occur either before, in time interval II, or after, in time interval IV.

Figure 3:
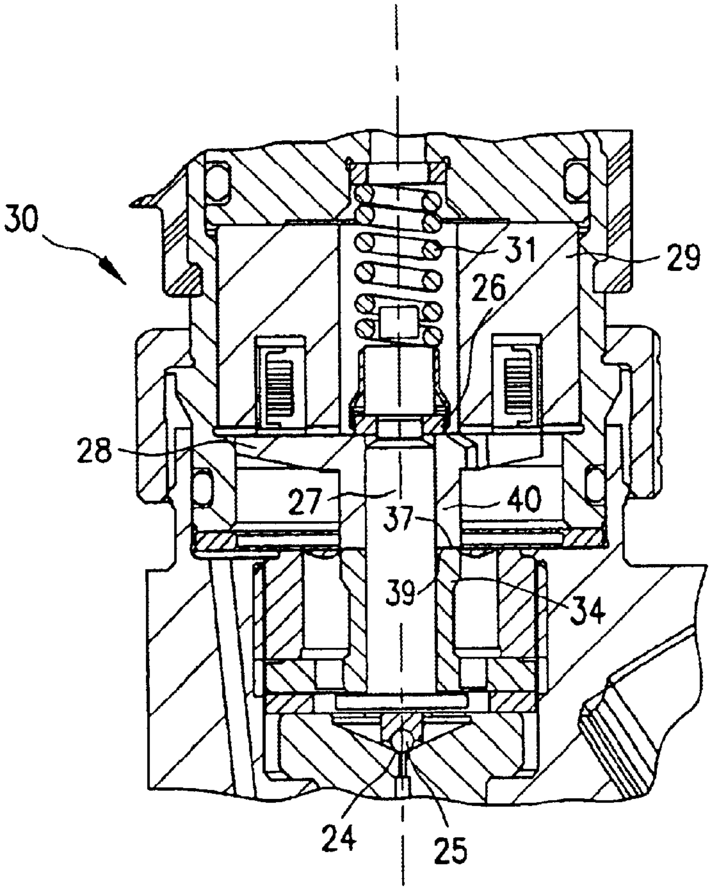
FIG. 3 shows a cross-sectional representation of the solenoid valve according to the present invention.
Figure 4:
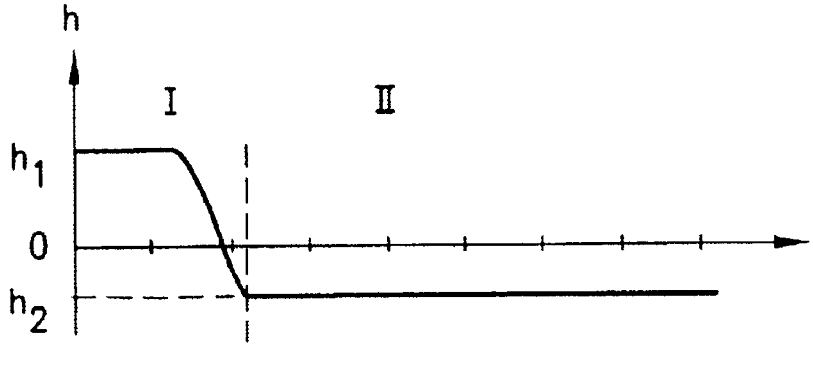
FIG. 4 shows the valve travel of the armature plate for the solenoid valve according to the present invention as a function of time.

FIG. 3 shows a cut-out of a cross-sectional representation of the solenoid valve, designed according to the present invention. Solenoid valve 30 according to the present invention differs from the known solenoid valve represented in FIG. 1 in that no return spring is provided at the solenoid valve. When electromagnet 29 is switched off, closing spring 31 moves the armature with armature plate 28, armature pin 27 and control-valve member 25 toward valve-seat 24. As soon as the control-valve member strikes valve-seat 24, armature plate 28, due to its inert mass, continues its movement on the now stationary armature pin. This movement of armature plate 28 is only subject to the laws of inertia, gravity, friction and the hydrodynamics of the fuel, and occurs without stress from a returning elastic spring force. The resulting movement of armature plate 28 is shown in FIG. 4. As illustrated in the known solenoid valve in FIG. 2, armature plate 28, in time interval I, initially moves with the armature pin by the opening valve travel h1, and subsequently, after the control-valve member has struck the valve seat, given a stationary armature pin, by the overtravel lift h2 up to overtravel stop 37, where armature plate 28 remains. The circular surface 39, adjacent to overtravel stop 37, of a nipple 40, which is formed at armature plate 28 and slipped over armature pin 27, forms a hydraulic damping chamber together with overtravel stop 37, by which the impact of armature plate 28 on the overtravel stop is damped. As can be seen in FIG. 4, no post-oscillations of the armature plate and no further opening of the solenoid valve occur in time interval II when the electromagnet is switched off. Therefore, the solenoid valve according to the present invention may be reactivated at any time as soon as the armature plate has reached its position at the overtravel stop.

If voltage is applied to the electromagnet during the opening of the solenoid valve, armature plate 28, due to the then acting magnetic force, is advanced very rapidly, by distance h2, up to stop 26 secured to the armature pin. The time delay, until the armature plate reaches stop 26, may be negligible in this case. This assumes that the maximum overtravel lift h2 is not too great. Therefore, the maximum overtravel distance by which armature plate 28 may move along armature 27 from stop 26 secured to the armature pin, after control-valve member 25 has struck valve seat 24 during the closing of the solenoid valve, should be less than 100 micrometer, and preferably less than 30 micrometer.

What is claimed is:

1. A solenoid valve for controlling a fuel injector of an internal combustion engine, comprising:

an electromagnet;

an armature including an armature pin that is movably supported with respect to the electromagnet;

a control-valve member moving with the armature and cooperating with a valve seat, to open and close a fuel passage; and an armature plate supported on the armature pin in a manner that allows sliding movement, the armature plate capable of being moved along the armature pin when the control-valve member strikes the valve seat during a closing of the solenoid valve, under the influence of its own inert mass, from a stop secured to the armature pin right up to a stationary overtravel stop about an overtravel path, the armature plate being supported on the armature pin between the overtravel stop and the stop secured to the armature pin, in a manner that is free of returning elastic spring forces and that allows sliding movement.

2. The solenoid valve according to claim 1, wherein a maximum overtravel distance, about which the armature plate may shift along the armature pin after the control-valve member strikes the valve seat during the closing of the solenoid valve, starting from the stop secured to the armature pin right up to the striking of the overtravel stop, is less than 100 micrometers.

3. The solenoid valve according to claim 2, wherein the maximum overtravel distance is less than 30 micrometers.

* * * * *